(No Model.)
G. W. HOLMES.
CARRIAGE BRAKE.
No. 513,577.
Patented Jan. 30, 1894.
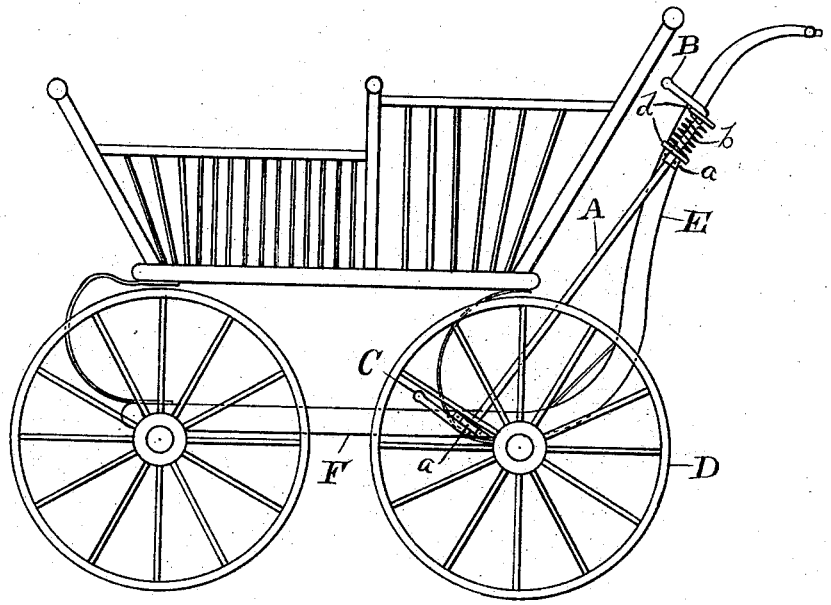
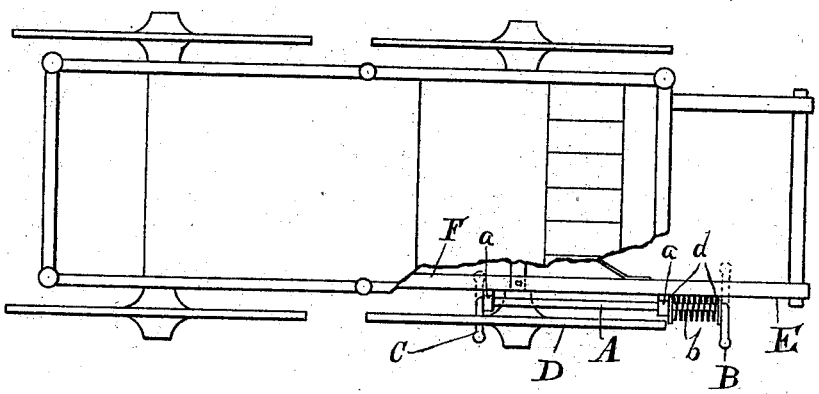
WITNESSES
J. C. Lemon
Chas. J. Ruffin
INVENTOR
George W. Holmes
per O. M. Hill
ATTORNEY
THE NATIONAL LITHOGRAPHING COMPANY,
WASHINGTON, D. C.

United States Patent Office.

GEORGE W. HOLMES, OF CINCINNATI, OHIO.

CARRIAGE-BRAKE.

SPECIFICATION forming part of Letters Patent No. 513,577, dated January 30, 1894.

Application filed August 14, 1893. Serial No. 483,106. (No model.)

*To all whom it may concern:*

Be it known that I, GEORGE W. HOLMES, a citizen of the United States, residing at Cincinnati, Hamilton county, State of Ohio, have invented certain new and useful Improvements in Carriage-Brakes, of which the following is a specification, reference being had to the accompanying drawings.

The object of my invention is to provide a simple and efficient brake for locking one or more wheels of a carriage, the same being more especially designed and adapted for use in connection with a baby carriage, as will more fully hereinafter appear.

In the accompanying drawings:—Figure 1, is a side elevation of a baby carriage provided with a brake embodying my invention and as preferably constructed; and Fig. 2, is a top view of same in an operative position to lock the wheel, a portion of the body of said carriage being broken away.

When constructed as shown, my improved brake consists of a rod, A, having a top angular handle portion, B, and a lower angular locking portion, C, said rod being revolubly connected to one side of the handle E, and its continued side-bar F, by means of suitable bracket bearings, $a$, as shown.

The operation of the device just described is quite simple. To lock the wheel of the carriage, all that is required is for the party trundling the same to give the handle B a lateral vibratory movement which will cause the angular portion C to swing over and between the spokes of the wheel, D, as shown in Fig. 2, thus locking the latter. When desired to move the carriage, the trundler gives the handle a reverse backward movement, which causes the portion C to swing backward out of contact with said wheel, as shown in Fig. 1, and by dotted lines in Fig. 2. It is preferred to provide the brake with a suitable friction device to retain the locking portion, C, in an unlocked position, to relieve any liability of said device locking itself by reason of the movement of the vehicle; and, with this object in view, I have provided a coiled spring, $b$, which encircles the rod A between the handle B and top bearing $a$,—suitable washers, $d$, being interposed at each end of said spring, the latter being contracted and under pressure.

The primary advantage of my invention consists in the security afforded to prevent accident and loss of life. It is well known that the least movement of the baby within the carriage will cause the latter to start of itself if on an inclined surface; and, if the party in charge of the child should, for any cause, not notice this movement, the carriage will travel with increased speed down the incline to the bottom thereof, often occasioning severe accident, and sometimes the death of the child is the result of this accident.

My improved brake is quite inexpensive and can be readily and quickly attached to any of the well-known forms of baby carriages now in use. If the party in charge of a child desires to leave the latter within the carriage for a short time, while shopping or otherwise engaged, it can be left to itself with security by simply turning the brake to lock the wheel, in the manner aforestated.

What I claim as new, and desire to secure by Letters Patent, is—

1. In a carriage constructed as set forth, the brake herein shown and described, consisting of rod A revolubly connected to one handle E and side-bar F, said rod having the angular handle portion B and the angular brake C, substantially as and for the purposes specified.

2. In a carriage constructed as set forth with handles E and side-bars F, the rod A revolubly connected to one handle and side-bar, said rod having the angular brake C and frictional spring, $b$, for holding said rod and its brake in an adjusted position, as set forth.

3. In a carriage constructed as set forth with handles E and side-bars F, the rod A revolubly connected to one of said handles and side-bar, said rod having a brake C rigidly connected thereto, coiled spring $b$ encircling said rod and held in position thereon by the washers, $d$, as and for the purposes set forth.

GEORGE W. HOLMES.

Witnesses:
O. M. HILL,
CHARLES LEHMER.